Jan. 10, 1939.  G. P. REINTJES  2,143,280
SUSPENDED FURNACE WALL
Filed Sept. 17, 1934   5 Sheets-Sheet 1
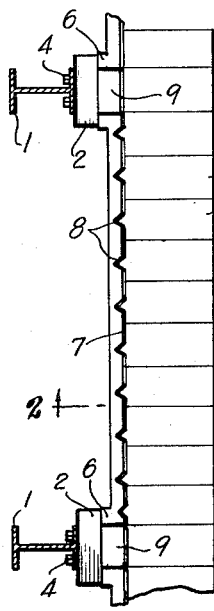
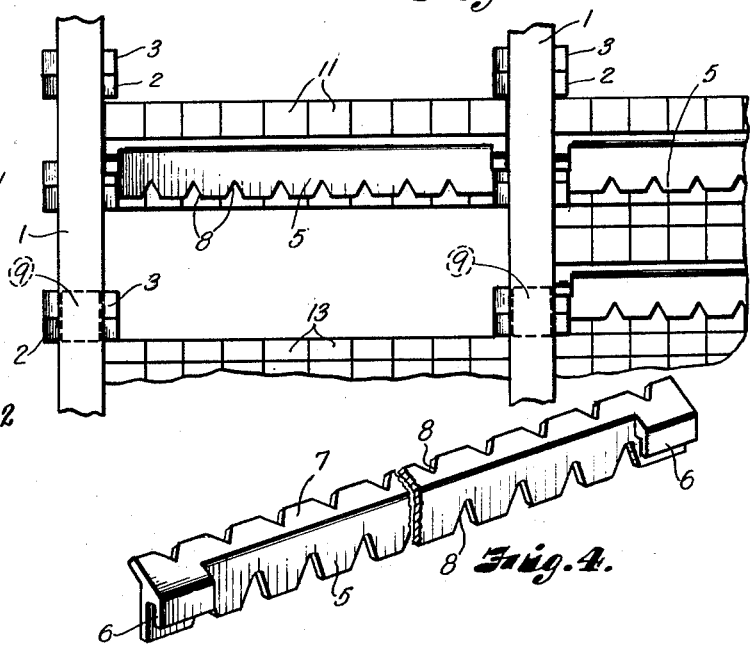
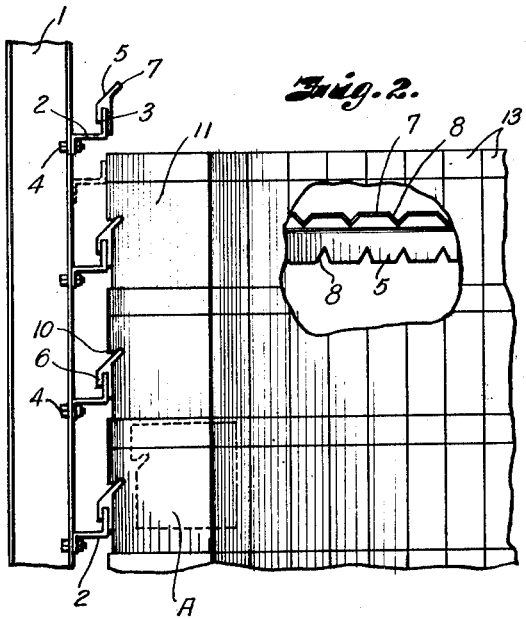
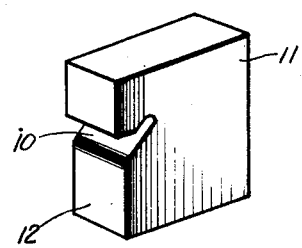
Inventor
George P. Reintjes
By Thorpe & Thorpe
Attorneys

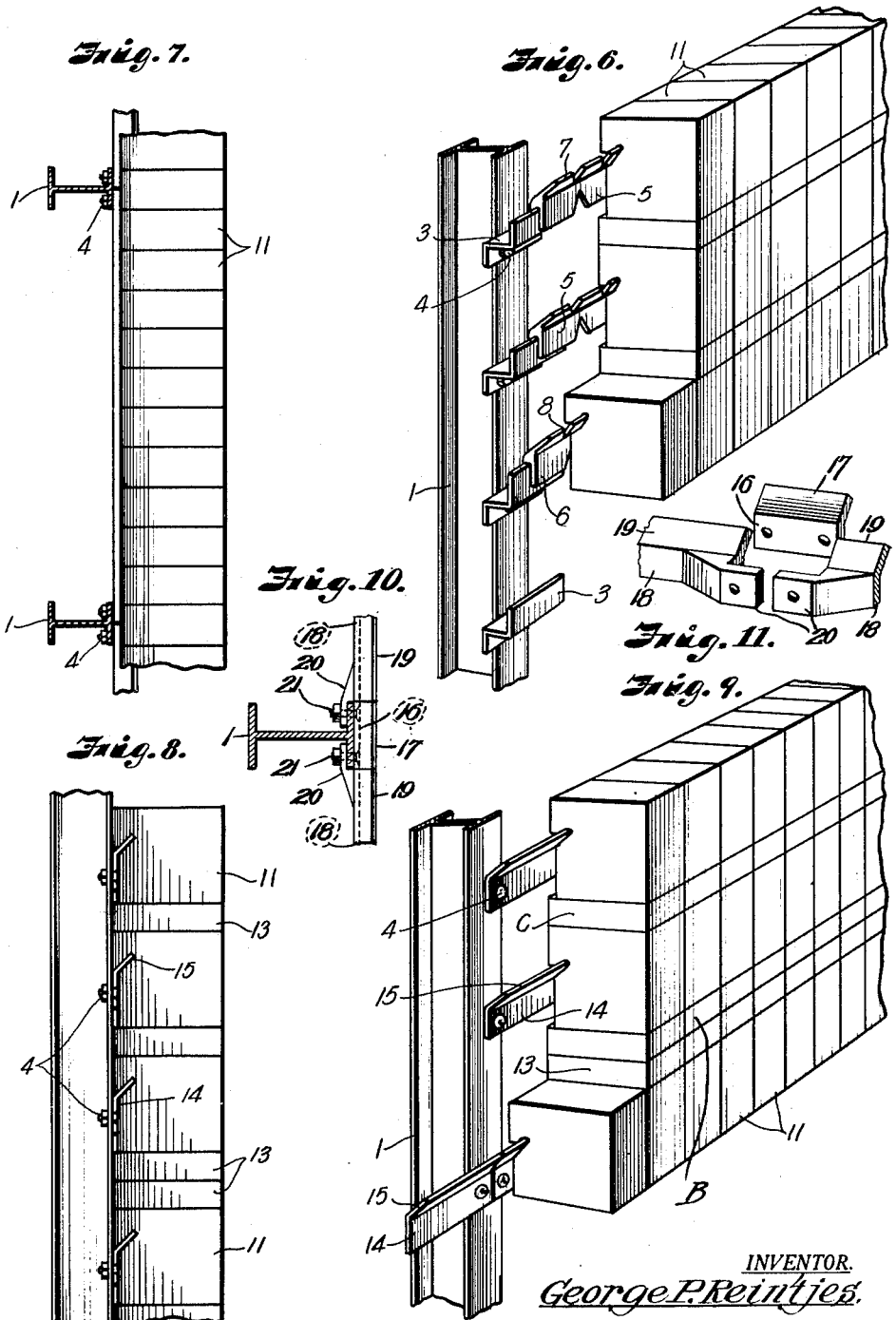

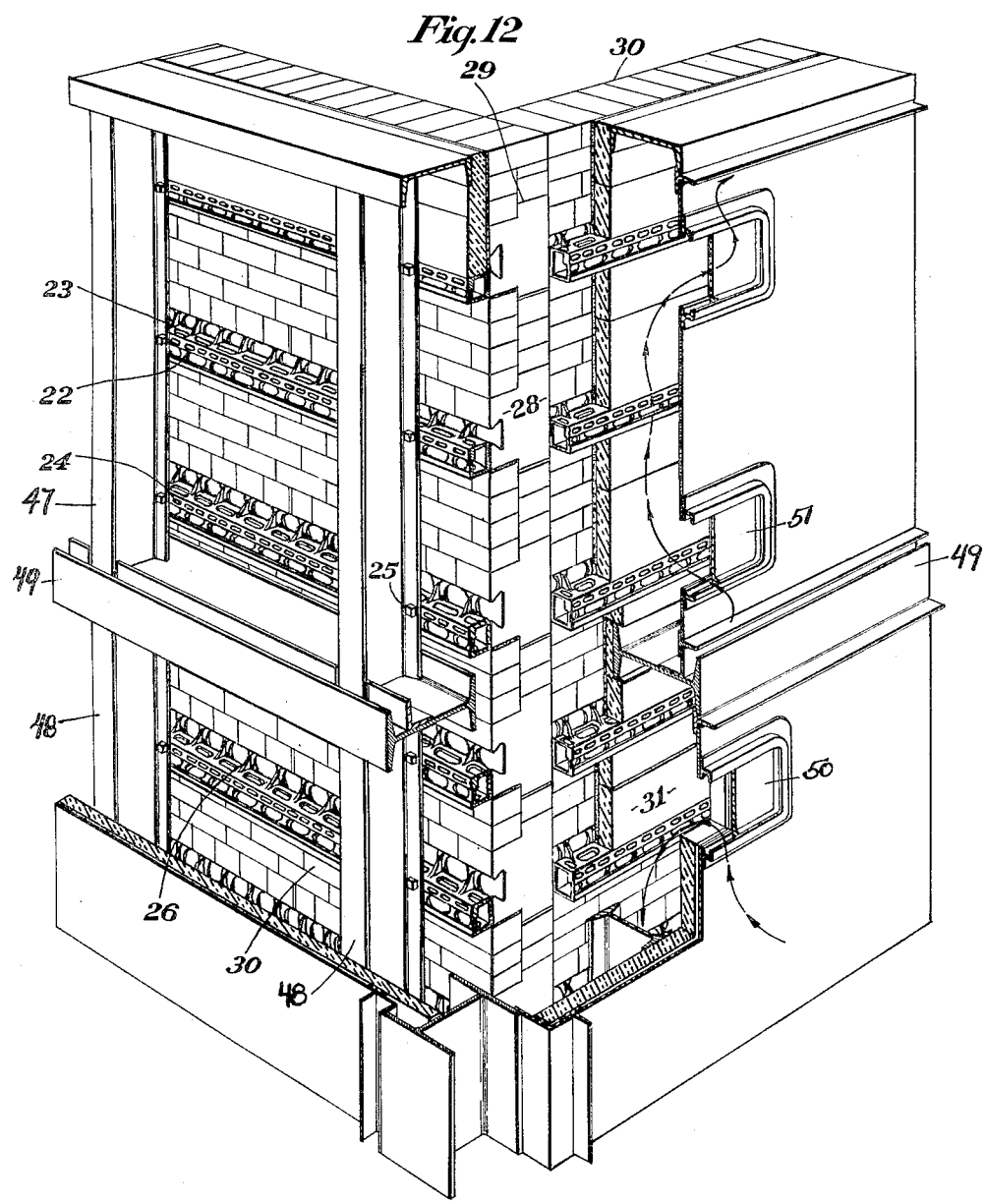

Jan. 10, 1939.　　　G. P. REINTJES　　　2,143,280
SUSPENDED FURNACE WALL
Filed Sept. 17, 1934　　　5 Sheets-Sheet 5
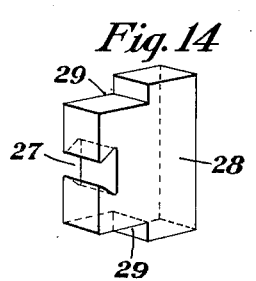
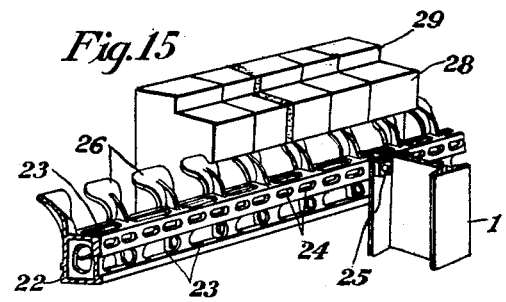
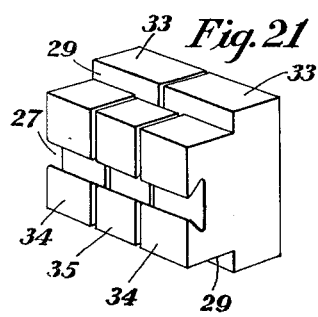
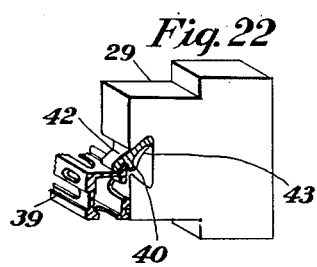
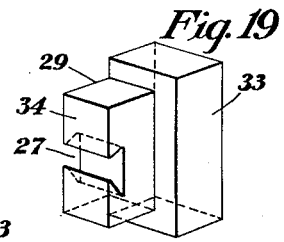
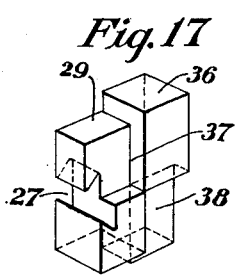
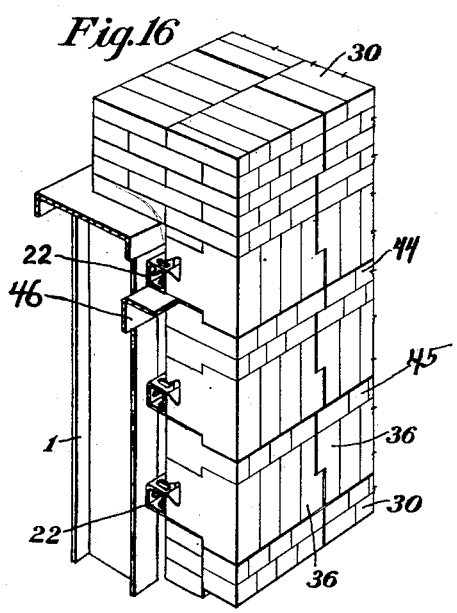
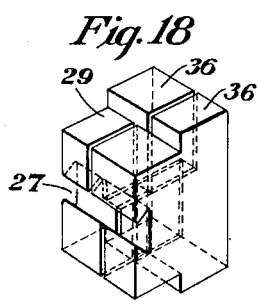
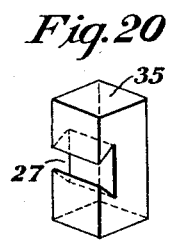
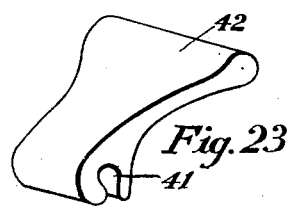
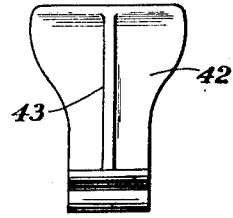
INVENTOR.
Geo. P. Reintjes
BY Thorper Thorpe
ATTORNEYS.

Patented Jan. 10, 1939

2,143,280

UNITED STATES PATENT OFFICE 2,143,280

SUSPENDED FURNACE WALL

George P. Reintjes, Kansas City, Mo.

Application September 17, 1934, Serial No. 745,554

11 Claims. (Cl. 72—101)

This invention relates to furnace wall construction and has for one of its objects to produce a suspended furnace wall of refractory or heat resisting material whereby the wall may be built to great heighth to meet modern furnace fuel conditions requiring large combustion chambers, without overloading any part of the refractory wall, the general object being attained by providing means imparting flexibility to the wall to accommodate large degrees of expansion through the formation of independently supported horizontal belts or courses. This application forms a continuation in part of my application for patent filed April 13, 1931, Serial No. 529,673.
Another object of the invention is to produce a construction in which the metal supporting parts are maintained well away from the high temperatures of the combustion chamber and are therefore protected against oxidation by the heat therein, the refractories in engagement with the metal parts being suspended therefrom.

A further object of the invention is to produce a construction which may be readily repaired either from within or without the furnace without alteration or removal of any part of the wall except that to be replaced.

Another object of the invention is to produce a construction in which the horizontal joints between adjacent refractories, such as brick or tiles, are formed with stepped faces whereby said joints are horizontally offset to prevent direct radiation of heat through such joints.

A further object of the invention is to provide blocks with offset or stepped side faces so that vertical expansion joints may be provided at predetermined points, thus permitting each section of a wall course or belt to shift transversely as a unit, the individual members being set in fusible material, the transverse movement being accommodated by the vertical expansion joints.

A still further object of the invention is to produce a hollow supporting bracket of skeleton or box form for the more perfect cooling of the bracket and the spacing of the tile from the vertical furnace supports or buckstays.

Another object of the invention is to produce a supporting tile with a double pocket of wedge shape in its rear face, so that the tile may be supported with either of its ends at the top, in other words, the tile is reversible, and a space is left to allow the air to circulate within the tile pocket for cooling the supporting flange from which the tile is suspended.

A still further object of the invention is to produce a construction of the general character outlined, which is of strong, durable, efficient and inexpensive construction; and in order that it may be fully understood, reference is to be had to the accompanying drawings, in which:—

Figure 1 is a top plan view of an air-cooled furnace wall embodying one form of the invention.

Figure 2 is a section on the line II—II of Figure 1.

Figure 3 is a rear view of a portion of a wall embodying the invention with one section or course, between a pair of column members, removed from position.

Figure 4 is a perspective view of the hangers used to suspend one type of tile between adjacent column members of the furnace wall.

Figure 5 is a perspective view of one of the suspended tile.

Figure 6 is a perspective view of a section of air-cooled wall of one type.

Figure 7 is a top plan view of a modified type of suspended furnace wall.

Figure 8 is an end view of a wall section of the construction shown in Figure 7.

Figure 9 is a perspective view of a modified wall such as shown in Figures 7 and 8.

Figures 10 and 11 illustrate two views of a modified construction.

Figure 12 is a rear or external perspective view of a furnace wall construction embodying the double pocket blocks with stepped top and bottom faces, and the skeleton supporting bracket

Figure 14 is a rear perspective view of a double pocket type of block having stepped upper and lower faces for cooperative engagement with the brick or tile columns.

Figure 15 is a rear perspective view of a series of blocks as shown in Figure 14 with special blocks in pairs to form a vertical expansion joint.

Figure 16 is a front perspective view of a wall section having a vertical expansion joint such as shown in Figure 15.

Figure 17 is a perspective view of a block used in making the expansion joint of Figures 15 and 16.

Figure 18 is a pair of tile or blocks such as shown in Figure 17, interlocked to provide the stepped vertical expansion joint.

Figure 13:
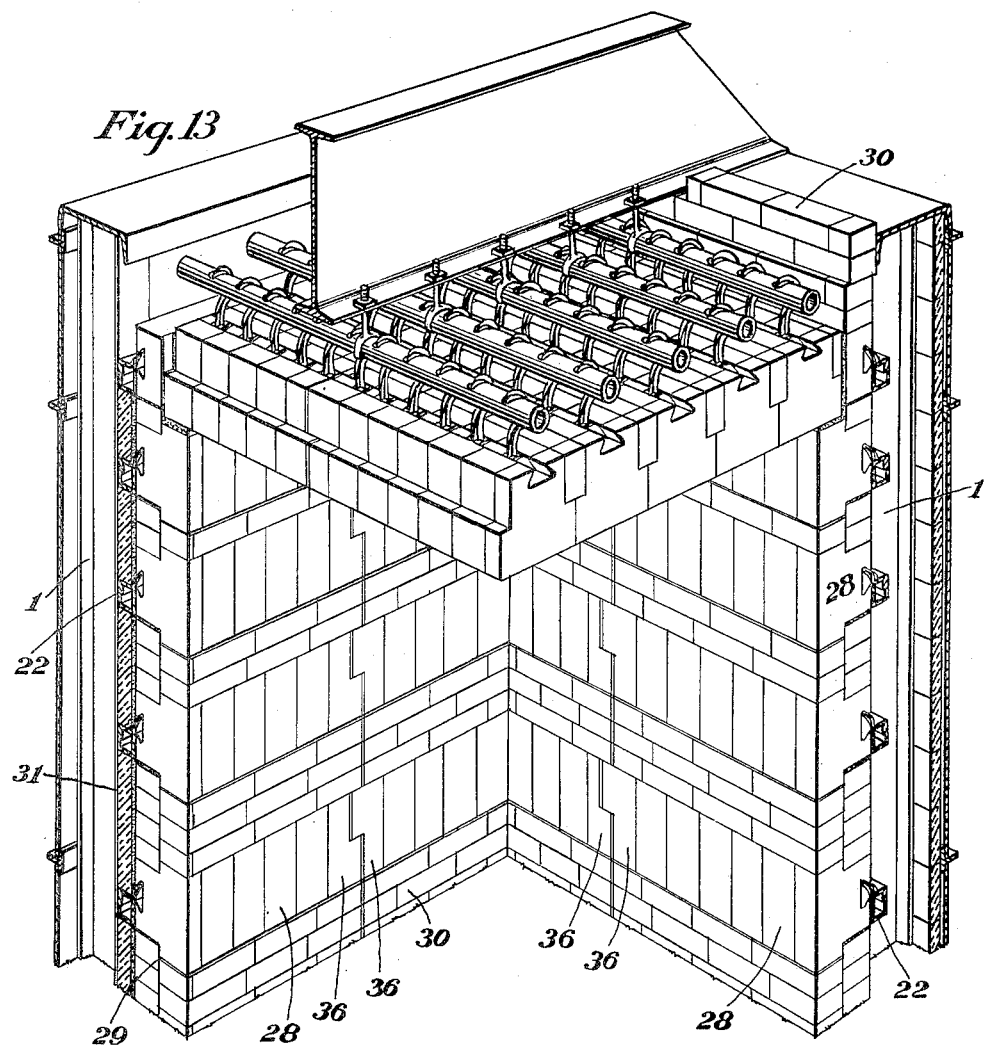
Figure 13 is an inner view of the construction as shown in Figure 12.

Figures 19, 20 and 21, respectively indicate blocks and a completed expansion joint, two tiles like Figure 19, and one tile like Figure 20, forming such joint as shown in Figure 21.

Figure 22 is a perspective view of a wall tile embodying the invention supported by an auxiliary hanger or bracket detachably carried by the box bracket secured to the buckstays.

Figure 23 is a perspective view of the auxiliary hanger shown in Figure 22.

Figure 24 is a view of the underside of the hanger of Figures 22 and 23.

In the said drawings, where like reference characters identify corresponding parts in all of the figures but now particularly referring to Figures 1 to 11 inclusive, 1 indicates a series of spaced upright metal column members which constitute the skeleton or framework of the furnace and being tied together against lateral movement in any suitable manner, not shown. The buckstays or columns 1, of course, will be exterior of the furnace lining and may be either inside or outside the outer wall if the furnace is air-cooled, and constitute a permanent support for the lining or suspended furnace wall as will hereinafter appear. In the construction of the invention primarily intended for air-cooled walls as shown in Figures 1 to 4 inclusive, and 6, where a space or passageway is provided for the circulation of air, a plurality of horizontal vertically-spaced rows of step-shaped brackets 2 are secured to the columns 1, said brackets projecting inwardly from the columns and each being formed with an upwardly extending hook or arm 3. The brackets 2, in the preferred construction, are detachably secured by bolts 4 to the columns 1, and preferably project on opposite sides of the columns as shown in Figures 1, 3 and 6.

Bridging the space between the columns 1 and overlying and resting on the projecting ends of the brackets 2 and carried thereby, are horizontal hangers 5 for refractory tiles, said hangers preferably being somewhat shorter in length than the distance between a pair of beams or supports 1, so that the hangers may be horizontally outwardly removed between a pair of the columns 1, it being understood, however, that the exact limit in length of the hangers is fixed only by the amount of space which is available for manipulation and angular or inclined withdrawal. Each hanger 5 is formed of a bar having a pair of arms arranged in angular relation, one arm of the bar having its opposite ends bifurcated to provide a pair of depending forks 6 receiving the hook portions 3 of the brackets 2. The other arm 7 of the hanger slopes upwardly and inwardly. Both arms of the hangers are preferably notched as at 8, see Figure 4, for the more efficient cooling of the metal and to prevent warpage. The hangers 5 are arranged on the brackets 2 as described, and short hangers 9, similar in all respects to the longer hangers 5, are inserted between the ends of adjacent hangers 5 to fill the space along the brackets 2, it being evident that an operator, if working from outside the wall may readily reach in and remove a short hanger, after removal of an abutting longer hanger 5, and its tile or refractory.

The arm 7 of the hangers detachably engages slots 10 formed in the outer faces of the blocks or tiles 11, it being evident that when each tile is fitted as explained upon its respective arm 6, the block will gravitate downwardly and outwardly on the arm until it is stopped through abutment of its outer vertical face 12 with the inner member of the forked portion 6, which maintains it in proper relation with its inner face in alinement with the other tile or refractories constituting the wall.

The wall is constructed in horizontal belts or courses, each course being sustained on a row of tile or blocks suspended from the hangers, and the balance of the belt being made up of one or more courses of ordinary fire brick 13, or other heat resisting blocks. It will be evident that the furnace wall may be repaired in any section without disturbing the adjacent sections, the only limitation on the spacing of the hangers, is that there must be sufficient distance A, see the dotted block in Figure 2, between the upper surface of one block course and the lower surface of the superposed block course, so that the block may be lifted upwardly and inwardly for detaching same from the hanger. Where all of the work is done from outside the wall, it will be apparent that even this clearance is not necessary as, by disengaging the brackets 2, it is possible to withdraw a hanger without previous removal of its tile, outwardly between a pair of the buckstays 1.

In Figures 7, 8 and 9, a modified construction is illustrated for use where it is desired to construct a wall of minimum thickness and where it is not necessary to leave a space or passageway for air circulation or to have a construction which may be repaired from outside of the furnace lining. This construction in its essential characteristics is similar to that above-described, except that a series of hangers comprising a pair of flanges 14 and 15, the former for engagement with the outer faces of the tile, and the latter for flatwise engagement and rigid securement to the inner face of the uprights 1, are secured to such uprights or columns in vertically spaced rows. In this construction the hangers are vertically spaced along the columns, the exact spacing being variable to suit the number of ordinary brick courses as shown at B and C in Figure 9, it being evident, however, that at least one brick course must be provided in order to have space for the placement or removal of a tile 11.

In practice expansion is compensated for by using a thick joint of compressibe material every three or four courses, or a thinner layer may be placed between every row or every other row of tile and brick courses. This construction is necessary in order to prevent over-loading of underlying units, particularly where the wall is carried to a great heighth and there would otherwise be a large cumulative expansion and consequently excessive weight imposed on the lower tile courses.

The construction shown in Figures 10 and 11 indicates one that is adapted to be used where a horizontal air space is not needed, but which may be removed outwardly between uprights 1. In this construction a short flange member comprising supporting flange 16 and tile flange 17 is adapted to be secured against an upright, the opposite ends of the long hangers having portions 18 and flange 19 respectively abutting corresponding portions of the short flange, and the former having an offset extending into engagement with the outer face of the inner flange of the member 1 as shown at 20, the assembly being secured together by bolts 21.

With certain types of fuel and furnace temperatures created thereby, it has been found that the adjacent blocks of the lining tend to become fused together. In service, it sometimes occurs that the lining will move laterally and when this occurs in a fused wall spalling and cracking will take place in a relatively vertical plane. To obviate this difficulty, I have found it desirable to provide vertical expansion joints at predetermined points throughout the length of a wall, thus dividing each horizontal course into a plurality of independent sections, as will hereinafter appear. Also with the high temperatures created in the modern furnace of large capacity, it is impossible to pack the usual horizontal expansion joints in such a manner that the packing will reliably hold up against the terrific heat. As neither the vertical nor the horizontal expansion joints can be permanently packed, I have found it desirable to step both types of joints by offsetting the abutting surfaces of the refractories or blocks, such constructions being clearly shown in Figures 12 to 24 inclusive.

In these figures, a series of horizontal rows of elongated hollow rectangular supporting brackets 22, having a series of air circulating openings 23 in their walls are employed. One of the side walls of the brackets is formed with spaced elongated bolt receiving openings 24 engaged by bolts 25 secured to the buckstays. The wall opposite the last-named wall has an upwardly and inwardly extending series of flanges 26 to engage dove-tail shaped pockets 27 in the outer faces of the blocks or refractories 28. Although the type of block shown in Figures 1 to 11 inclusive, may be used in this construction, it has been found desirable to produce a block of T-shape in side elevation to form upper and lower stepped faces 29, the stem of the T's being provided with said pockets 27, so that the blocks are reversible and may be secured with either end upward. The dove-tail pockets 27 also provide means for the better cooling of the flanges 26 of the brackets 22 supporting the blocks.

As shown in Figures 12 and 13, the blocks 28 are mounted in spaced horizontal rows, their stepped portions being about one-half the thickness of a standard brick or refractory 30 so that, in practice, there will be one more course of brick in the outside column than in the inside column of each belt of the lining. The skeleton supporting brackets 22, also provide convenient supports for insulation 31 interposed between the outside face of the lining and the air lane enclosed by the outside furnace casing 32, Figure 12. This construction is very flexible and lends itself to rows of blocks or belts of any desired heigth, as illustrated, so that door frames or the like may be accommodated, where necessary, without specially shaped tile or special supporting brackets. With the offset expansion joints, a large degree of expansion can occur in a vertical plane without opening of the joints entirely through the wall into the air lane.

As the units of a horizontal course or belt are sometimes fused together with a consequent cracking or spalling of the wall upon lateral shifting movement, I have found it desirable to provide the wall with spaced vertical expansion joints. In the drawings, I have illustrated two types of vertical expansion joint, one type being detailed in Figures 19, 20 and 21, and the other type being shown in Figures 13, 16, 17 and 18. In Figures 19 to 21 inclusive, the expansion joint is made up of blocks 33 having their stem portions 34 offset to one side of the rear face of the block. When it is desired to produce an expansion joint, a pair of these blocks are arranged in reversed relation, thus providing a pocket or space between their stem portions, which is filled with a rectangular block 35, see Figures 20 and 21. In the second type of expansion joint, a pair of blocks 36 of slightly greater thickness than the ordinary block (Figure 14), each having about 30% of its stem portion above the horizontal center line of the block, cut away as at 37, and a corresponding amount of the face of the block below the horizontal center line and on the same side of the vertical center line, is correspondingly cut away as at 38, see Figure 17. A pair of these blocks, in reversed relation, as shown in Figure 18, will provide a vertical broken expansion joint as shown in the assembled wall, Figure 16.

It has been found that on occasions, it is desirable to have the blocks supported from a separate casting and not directly on the skeleton box brackets 22, and to meet such conditions, the construction shown in Figures 22, 24 and 25 is provided. In this modified construction, the supporting box bracket 39, carried by the buckstays is formed with an upstanding rounded bead 40 at its upper front corner, which is received within a pocket 41 formed in the lower rear end of an auxiliary supporting flange 42, corresponding generally in shape to the flanges 26 of the bracket 22, as shown in the other figures of the drawings. The flange 42 is supplied with an underlying supporting and stiffening rib 43, Figures 24 and 25. When this auxiliary flange is used, the block as shown in Figure 22, has its lower end in abutment with the box casting to hold the blocks in vertical alinement. With this type of construction the auxiliary brackets may be spaced along the length of the skeleton bracket as desired.

In Figure 16, the flexibility of the structure is illustrated, by the use of special shaped tiles to cooperate with the stepped supporting tile 36, instead of ordinary fire brick as shown in the other figures. Two special shapes of tile 44 and 45 are illustrated, the former of L shape and being used in pairs, and the latter being of generally T shape, but reversed as regards the T shaped supporting blocks 36. It will also be noted in Figure 16 that where there is a specially heavy superimposed load, the supporting bracket 22 may be reinforced by an underlying standard structural angle bracket 46 to obviate the necessity of using a specially heavy bracket 22 to stand the load.

In Figure 12, the vertical buckstays are divided into upper and lower sections 47 and 48 respectively, being separated by a horizontal beam 49. The beam 49 acts not only to reinforce the buckstays against gyratory movement on account of their heigth, and against buckling and cross stress, but also has the function of dividing the air lane into upper and lower independent sections so that air may enter damper door 50 and flow downwardly and through damper door 51 and flow upwardly. In considering the air flow it is to be noted that with the skeleton brackets 22, spacing the refractories away from the buckstays, the air circulating behind the lining may flow vertically or horizontally as needed and is not confined by the lining supports to predetermined lanes.

I claim:—

1. A structural element for furnace walls comprising hangers for refractory linings formed of a hollow elongated member having air circulating passageways through its walls, a series of spaced bolt receiving openings in one of its walls, the wall opposite said last-named wall being formed with an upwardly and inwardly projecting refractory receiving flange.

2. A furnace wall construction comprising column members arranged in horizontally spaced relation, a plurality of rows of horizontal hangers carried by said column members, said rows being spaced apart vertically, rows of T-shaped vertically spaced blocks carried by said hangers, the head of the T extending vertically to provide upper and lower stepped surfaces, and refractories carried by the undermost blocks and having offset portions interlocked therewith and with the stepped portion of the underside of the uppermost block.

3. An expansion joint for furnace linings, comprising a pair of blocks in sidewise abutting relation, the abutting faces of each block being stepped so that the joint therebetween is offset both vertically and horizontally, the rear faces of said blocks being provided with oppositely facing pockets so that the blocks may be reversed as regards their respective positions in a furnace wall.

4. A furnace wall construction comprising column members arranged in horizontally spaced relation, a series of brackets secured to said members in horizontal alinement, each of said brackets being secured to the inner face of its respective column and being of greater length than the width of the columns so that it projects beyond the columns, and hangers adapted to receive a plurality of blocks for the full length of the hangers, said hangers being of such length as to pass horizontally between adjacent columns and having depending bifurcated portions receiving and supported by the projecting ends of the brackets.

5. A furnace wall construction comprising column members arranged in horizontally spaced relation, a series of brackets secured in horizontal alinement to the column members and being formed with an upstanding hook portion, and a series of tile hangers having downwardly opening forked portions engaging the hook portions of the brackets and being provided with an upwardly and inwardly extending tile engaging flange.

6. An expansion joint for furnace walls, comprising a supporting hanger, a pair of blocks carried by the hanger and having portions spaced from the hanger in juxtaposition to form a pocket or space between the hanger and their juxtaposed portions, and a filler block fitted in said pocket and having its outer face engaged with said hanger.

7. A tile having one of its side faces substantially quartered to form two pairs of diagonally arranged sections, the sections of each pair being in a different plane than the sections of the other pair.

8. A tile having one of its faces substantially quartered to form two pairs of diagonally arranged sections, the sections of each pair being coplanar, but in a different plane than the plane of the other pair of coplanar sections.

9. A furnace wall construction comprising a plurality of columns arranged in horizontally spaced relation, a series of upwardly and inwardly inclined hangers supported by the columns and arranged in horizontally alined vertically spaced rows, the hangers being formed with downwardly extending abutment portions, and tile having inclined pockets in their outer faces engaged with said hangers and being held in vertical alinement by abutment of their outer faces with the abutment portions of the hangers, the upper surfaces of said tile forming shelves for the reception of superposed tile.

10. A furnace wall construction comprising a plurality of columns arranged in horizontally spaced relation, a series of brackets secured to the columns in horizontal alinement, said brackets having an upwardly extending bead and a downwardly extending abutment, hangers slidably engaging the beads and inclined upwardly and inwardly, and a plurality of tile suspended from said hangers and having their outer faces in abutment with the bracket abutment to prevent said tile from gravitating out of engagement with the hangers.

11. A furnace wall construction comprising a series of upright horizontally spaced columns, a horizontal row of upwardly and inwardly inclined hangers carried by said columns, said hangers having downwardly extending abutment portions, tile having pockets in their outer faces engaging the hangers and held in vertical alinement from pivoting out of engagement therewith, through contact by their outer faces with the abutment portions of said hangers.

GEORGE P. REINTJES.